US012699699B2

(12) United States Patent
Lachenmayr

(10) Patent No.: US 12,699,699 B2
(45) Date of Patent: Aug. 4, 2026

(54) COMPUTER-IMPLEMENTED METHOD FOR ANALYZING A TRANSACTION LOG

(71) Applicant: Siemens Aktiengesellschaft, Munich (DE)

(72) Inventor: Markus Lachenmayr, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 215 days.

(21) Appl. No.: 17/126,577

(22) Filed: Dec. 18, 2020

(65) Prior Publication Data

US 2022/0197945 A1 Jun. 23, 2022

(51) Int. Cl.
| *G06F 16/20* | (2019.01) |
| *G06F 16/18* | (2019.01) |
| *G06F 16/23* | (2019.01) |
| *G06F 16/2455* | (2019.01) |
| *G06F 16/908* | (2019.01) |

(52) U.S. Cl.
CPC .... *G06F 16/24564* (2019.01); *G06F 16/1805* (2019.01); *G06F 16/1865* (2019.01); *G06F 16/2365* (2019.01); *G06F 16/908* (2019.01)

(58) Field of Classification Search
CPC .............. G06F 16/1805; G06F 16/1865; G06F 16/2365; G06F 16/24564; G06F 16/908
See application file for complete search history.

(56) References Cited

U.S. PATENT DOCUMENTS

| 6,735,690 B1* | 5/2004 | Barry | .................. G06F 9/30112 |
| | | | 714/34 |
| 8,806,550 B1* | 8/2014 | Chan | .................. H04N 21/6168 |
| | | | 725/100 |
| 10,650,032 B1* | 5/2020 | Laurence | ................ G06F 16/30 |
| 10,701,096 B1* | 6/2020 | Johnston | ................ G06Q 10/20 |
| 11,366,842 B1* | 6/2022 | Swaminathan | ....... G06F 16/334 |

(Continued)

FOREIGN PATENT DOCUMENTS

CN          113971076 A  *  1/2022

OTHER PUBLICATIONS

English translation of CN113971076A (Year: 2022).*

(Continued)

*Primary Examiner* — Diedra McQuitery
(74) *Attorney, Agent, or Firm* — Schmeiser Olsen PLLC

(57) ABSTRACT
Provided is a computer-implemented method for analyzing a transaction log, stored in a computer readable storage medium, wherein the transaction log comprises records of transactions in the range of zero to a plurality of records, wherein each record of transaction comprises at least one action executed during a test and at least one associated recorded criterion, comprising the steps: a. Providing the transaction log and at least one filter criterion; b. Determining records of transactions from the transaction log to be filtered in accordance with the at least one filter criterion; wherein the at least one filter criterion matches the respective associated recorded criterion of the action at least one action of the respective filtered records of transactions of transaction; c. Determining a test verdict based on the filtered records of transactions of transaction; and d. Providing the filtered records of transactions, the test verdict and/or related data as output.

19 Claims, 2 Drawing Sheets

(56)          References Cited

U.S. PATENT DOCUMENTS

Figure 2:
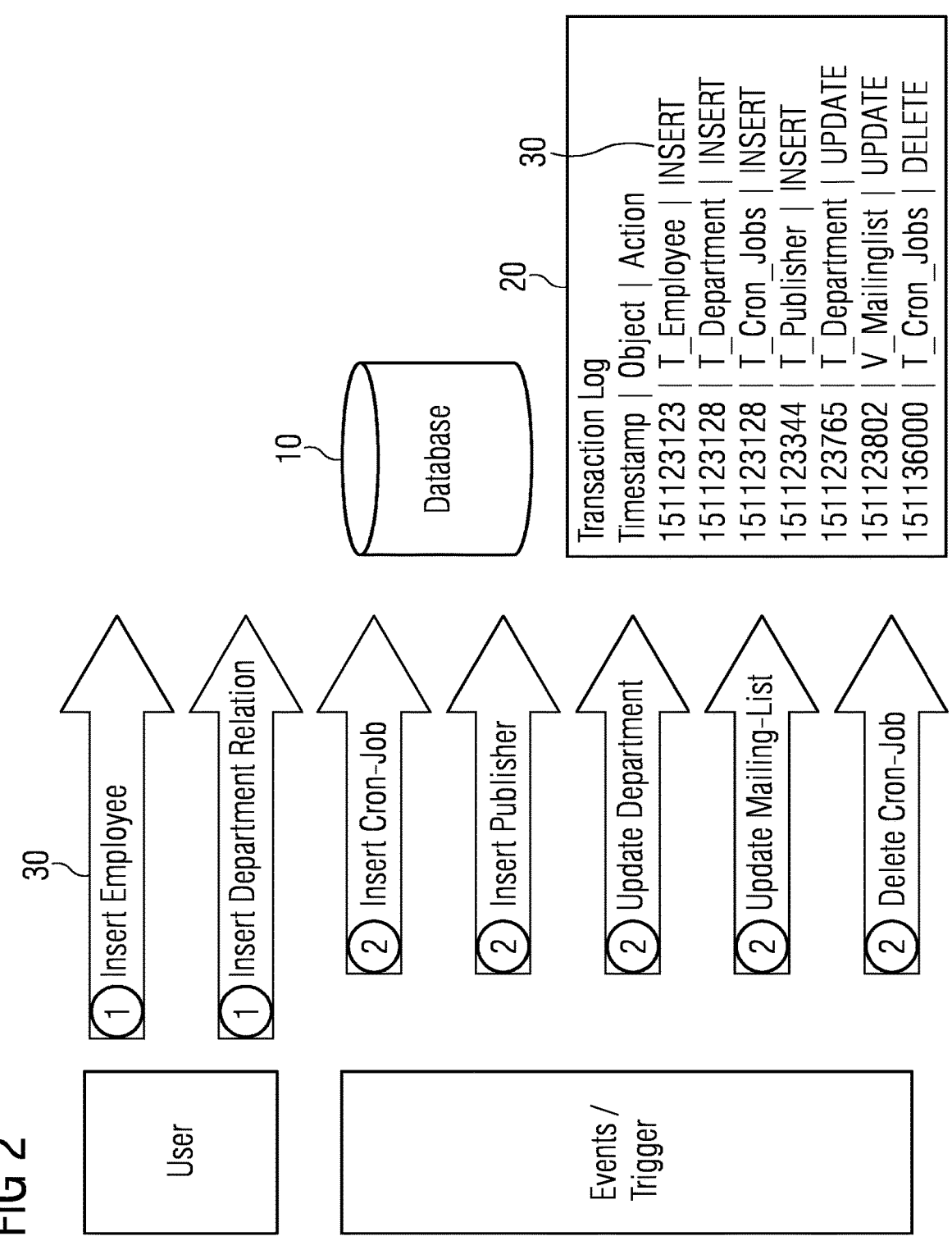

| | | | |
|---|---|---|---|
| 2005/0108716 A1* | 5/2005 | Douceur | G06F 9/4881 |
| | | | 718/100 |
| 2013/0111479 A1* | 5/2013 | Chen | G06F 11/3433 |
| | | | 718/100 |
| 2018/0349254 A1* | 12/2018 | Hui | G06F 11/3692 |
| 2021/0097199 A1* | 4/2021 | Liao | G06F 21/604 |
| 2021/0117297 A1* | 4/2021 | Ryan | G06F 11/26 |
| 2021/0191845 A1* | 6/2021 | Bach | G06F 11/3692 |
| 2022/0046036 A1* | 2/2022 | Bastawala | G06F 11/3006 |

OTHER PUBLICATIONS

Mejia, S. C. Acta Dependencies as a Unified Mechanism for Compensation, Activities Synchronization and Functional Replication in BPEL4WS (Doctoral dissertation, Vrije Universiteit Brussel). (Year: 2006).*

* cited by examiner

FIG 1

COMPUTER-IMPLEMENTED METHOD FOR ANALYZING A TRANSACTION LOG

FIELD OF TECHNOLOGY

The present invention relates to a Computer-implemented method for analyzing a transaction log. Further, the invention relates to a corresponding computing unit and a corresponding computer program product.

BACKGROUND

Currently there is a trend of digitalization in the industry domain. Hence, e.g., a manufacturing process for a product may be digitally controlled. For describing several facets of this trend the term "Industry 4.0" (in German: "Industrie 4.0") is a commonly used. It has become not only a major part of today's industry, but it also drives the business in many industrial domains.

A core facet underlying Industry 4.0 and the digitalization is the connectivity of different devices to the Internet. This results in the so called IoT (Internet of Things) used as a hypernym for a network of heterogeneous devices—e.g. IoT-devices (Internet of Things devices)—connected to and through the Internet. Thus, devices and systems participating, e.g., in manufacturing processes or end products of such a manufacturing processes may be connected to cloud platforms or the Internet, e.g., for connecting and/or controlling them. Based on this, several applications, tasks or services may be facilitated across different domains such as: preventive maintenance, load prediction, real-time production monitoring, or pay-per-use billing.

In view of Industry 4.0 several companies are providing IoT platforms, which are offering such applications/tasks/services for the devices connected to their platforms, e.g.: Siemens MindSphere, AWS IoT by Amazon, Bosch's IoT Suite, Microsoft's Azure IoT Suite, IBM Watson, or GE Predix. Such an IoT platform may be designed as an—so-called—"ecosystem platform" such that other companies or entities (also called 3rd parties) can develop applications or apps, in particular IoT-applications (Internet of Things applications), and upload these—e.g. against a fee—in the respective IoT-platform. Other companies can make use of the services offered by the apps either by buying the apps or via payper-use licensing. This may create a scenario with a win-win situation for all participating parties: (i) the platform provider profits from developer and user licenses for its platform, as well as from the fees paid to upload an app and also a certain amount for every purchased app, (ii) IoT device owner can optimize his production process by using dedicated apps without spending money and efforts for the app development; (iii) app developers earn money from the companies by selling apps and services to them.

Yet, in such a scenario, quality assurance of IoT-applications, which may be developed and/or provided by third parties as, e.g., third-party apps, or—likewise—a platform provider, who does not necessarily own all IoT devices connected to the platform, may pose a challenge. The app providers/developers have to make sure that their apps run smoothly on the target IoT-devices and they cannot cause any damage. The IoT platform provider has on the other hand to ensure that services offered by him (e.g. app deployment, app configuration, data transfer etc.) also work as expected in the combination with the IoT-devices.

For quality assurance, such an IoT-application may be tested and, e.g., executed. For this purpose, fully equipped and functional IoT-devices, which may execute the IoT-application, are currently employed in test cases. Additionally, simulators and emulators, which are software-based programs imitating the behavior of a physical IoT-device, are currently used. However, using fully-equipped IoT-devices may increase the cost of testing, and thus, of developing IoT-applications, whereas using simulators/emulators limits the testing to such IoT-devices that are available within a simulators/emulator as well as limits the testing to a precision of simulation.

Usually, an action (primary action) triggers further subsequent actions (secondary actions). For example, a database trigger responds to an update. Further examples included: A function is activated depending on exceeding a predefined threshold, Batch-Jobs are activated depending on the costs and availability of cloud resources etc.

According to prior art, in the first place, solely the primary actions are monitored and analyzed. Hence, the secondary actions running in the background, however, are neglected. As a consequence, the secondary actions are not tested.

Moreover, according to prior art, alternatively an image of the database can be generated and loaded into a storage unit. The generated image can be compared with the current database and searched for any differences after executing an action. The disadvantage is that this approach is resource-intensive, since a high storage space is required depending on the size of the image.

SUMMARY

It is therefore an advantage of the embodiments to provide a computer-implemented method for analyzing a transaction log in an efficient and reliable manner.

This problem is according to one aspect of the invention solved by a computer-implemented method for analyzing a transaction log, stored in a computer readable storage medium, wherein
the transaction log comprises records of transactions in the range of zero to a plurality of records of transactions, wherein
each record of transaction comprises at least one action executed during a test and at least one associated recorded criterion,
comprising the steps:
  a. Providing the transaction log and at least one filter criterion;
  b. Determining records of transactions from the transaction log to be filtered in accordance with the at least one filter criterion; wherein the at least one filter criterion matches the respective associated recorded criterion of at least one action of the respective filtered records of transactions;
  c. Determining a test verdict based on the filtered records of transactions; and
  d. Providing the filtered records of transactions, the test verdict and/or related data as output.

Accordingly, the invention is directed to a computer-implemented method for analyzing a transaction log. The transaction log is stored in a computer readable storage medium, including volatile and non-volatile storage units such as a database. Thereby, the transaction log comprises records of transactions as a result of respective actions and one or more criteria related to the actions. Preferably, the actions are primary and secondary actions and the criteria of the actions are e.g. time stamps and/or the database user, that has triggered the primary and secondary actions. Hence, in other words, a record of transaction delivers the information of the executed action e.g. at the specific time of execution.

Furthermore, the filtered and analyzed transaction log records can comprise all kind of database processings (create, read, update and delete).

In a first step, the transaction log and the filter criterion are provided or received as input data for the next method steps. This input data can be received via one or more interfaces of a receiving unit e.g. from a data storage unit. The output data of the method in the last step can be transmitted or sent via one or more interfaces of a transmitting unit, e.g. to a computing unit.

In the next step, the transaction log with the records of transactions is filtered using the filter criterion to retrieve those records of transactions meeting the filter criterion, preferably the time stamp. An additional or alternative filter criterion is e.g. the database user (database session) that has caused the actions can be considered. In other words, the records of transactions in a specific time frame, between two time stamps can be retrieved. Thereby, zero to at least one record of transactions can be filtered and determined using the filter criterion. Hence, in other words, the filtering step can also result in no records of transactions in the time frame of interest.

This way, all related subsequent actions triggered by one start or first action, particularly a primary action, can be retrieved in an efficient and reliable manner. Hence, contrary to prior art, no actions are neglected or lost for the later analysis and generation of a test verdict, particularly secondary actions. As a special case of secondary actions also recursive actions can be mentioned, which can lead to a deep sequence of nested secondary actions.

In the next step, a test verdict is determined based on the retrieved records of the transaction log. For example, it can be verified whether the number of determined database processings deviate from the number of expected database processings in the time frame of a test. An equal number of database processings leads to a positive test verdict, whereas a deviation leads to a negative verdict.

For example, if the tester expects only two update processings in table A, but there are instead two update processings and one delete processing in table A, then the verdict of the test must be negative. The tester can get the information of the test verdict and can further analyze if he has missed the deletion processing in his expectation or if this is an unintended behavior of the system. Additional or alternative measures can be initiated depending on the test verdict.

In the last step, the filtered records, data of intermediate method steps and/or related data are provided.

In one aspect, the method further comprises the previous steps for recording and providing the transaction log as input for step a.:

Initiating a test in accordance with a specified criterion, by a data processor;

Executing a plurality of computer instructions stored on a computer readable storage medium to perform the at least one related action to be tested, by the data processor;

Writing the executed at least one action with respective criteria in form of records of transactions of transaction into the transaction log, by the data processor; and Providing the transaction log, by the data processor.

Accordingly, the transaction log which is required as input for the method steps can be provided by executing computer instructions on a computing unit by a data processor and recording the related actions into the transaction log.

In another aspect, the at least on action is an action selected from the group comprising a primary action and a secondary action, preferably at least one primary action and associated at least one secondary action. Accordingly, preferably, primary and secondary actions related or triggered by the primary action are determined in step b.

In another aspect, the computer readable storage medium is a database or other storage unit.

In another aspect, the method further comprises the step of performing at least one action.

In another aspect, the at least one action is selected from the group, comprising:

Outputting the filtered records of transactions, the test verdict, related transaction log data and/or message in accordance with the test verdict;

Storing the filtered records of transactions, the test verdict, related transaction log data and/or message in accordance with the test verdict;

Displaying the filtered records of transactions, the test verdict, related transaction log data and/or message in accordance with the test verdict;

Transmitting the filtered records of transactions, the test verdict, related transaction log data and/or message in accordance with the test verdict to a computing unit; and Initiating at least one further measure depending on the message.

Accordingly, the input data, data of intermediate method steps and/or resulting output data can be further handled. The output data is in particular the test verdict. One or more actions can be performed. The action can be equally referred to as measure.

These actions can be performed by one or more technical units, such as computing unit or robot unit. The actions can be performed gradually or simultaneously. Actions include e.g. storing and processing steps. The advantage is that appropriate actions can be performed in a timely manner.

A further aspect of the invention is a computing unit e.g. robot unit or another autonomous unit.

The unit may be realized as any devices, or any means, for computing, in particular for executing a software, an app, or an algorithm. For example, the unit may consist of or comprise a central processing unit (CPU) and/or a memory operatively connected to the CPU. The unit may also comprise an array of CPUs, an array of graphical processing units (GPUs), at least one application-specific integrated circuit (ASIC), at least one field-programmable gate array, or any combination of the foregoing. The unit may comprise at least one module which in turn may comprise software and/or hardware. Some, or even all, modules of the unit may be implemented by a cloud computing platform.

A further aspect of the invention is a computer program product (non-transitory computer readable storage medium having instructions, which when executed by a processor, perform actions) directly loadable into an internal memory of a computer, comprising software code portions for performing the steps according to the aforementioned method when said computer program product is running on a computer.

BRIEF DESCRIPTION

In the following detailed description, presently preferred embodiments of the invention are further described with reference to the following figures:

Figure 1:
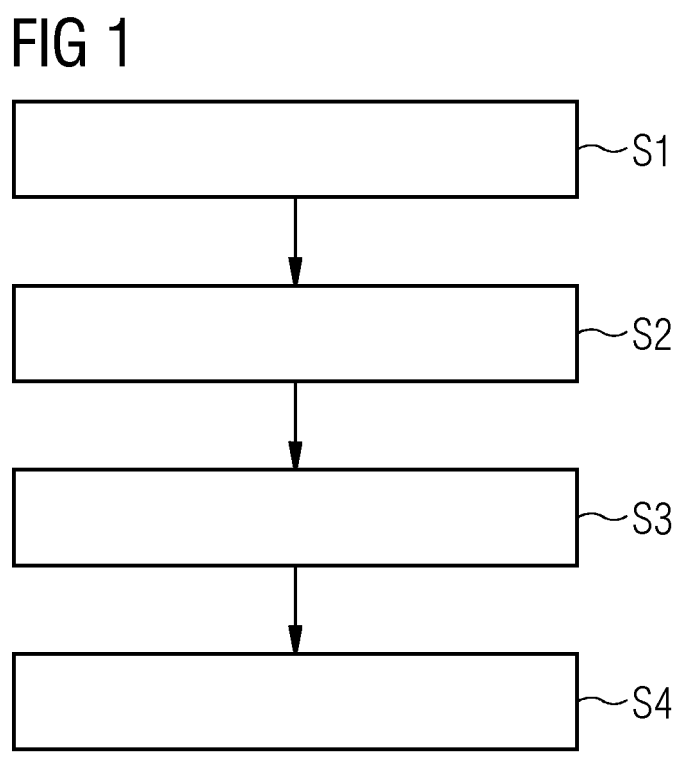

FIG. 1 shows a schematic diagram of the method according to embodiments of the invention; and FIG. 2 illustrates a transaction log according to an embodiment of the invention.

DETAILED DESCRIPTION

FIG. 1 illustrates a flowchart of the method according to the invention with the method steps S1 to S4. In the first step S1, the transaction log 20 and the filter criterion to filter the transaction log 20 are provided or received as input data for the next method steps. In the next method steps S2 to S3, the transaction log 20 is filtered using the filter criterion to determine the relevant transactions, which can be used as input to determine and provide the test verdict. In the last step S4, the test verdict is provided. Additionally or alternatively, other data can be also provided.

FIG. 2 illustrates a plurality of actions 30 against a database 10. Thereby, the actions are directed to a change or adaptation in the database such as Insert, Update and Delete.

The listed actions indicated with the first number are primary actions. The other actions indicated with the second number are secondary actions, which are performed in the background. These secondary actions can be initiated by a trigger or other means such as Listener.

In case of an automated test, first, the current time is specified or defined as a time stamp. Then, the use case or action to be tested is triggered at the predefined time stamp. For example, a new employee can be created as exemplary test. The related primary actions are Insert actions, namely Insert Employee and Insert Department relation indicated with the number 1 in FIG. 2. The primary and secondary actions to create the employee are executed during the test and are recorded in the transaction log, respectively. The resulting transaction log is used for the method according to the inventions as input.

After performing the test, the transaction log can be used as input in step S1 to determine all transactions and actions, which were performed during the test, triggered at the specified time stamp.

In other words, the transaction log can be used to monitor the scope and impact of actions e.g. user actions.

This way, any changes and adaptations can be determined in an efficient manner.

According to an embodiment, the entries of the transaction log can be used as input for Assertions of Unit-Tests to determine an automated test verdict in step S3.

Thereby, AssertTrue is a function which can be used in a test. This function provides "true" in the event of a positive or successful test verdict and false in the event, that the test does not result in the expected result.

Exemplary assertions are listed in the following:
assertTrue(number of expected changes==Number of actual changes, error message)
assertTrue(number of expected changes in the table T_User==Number of actual changes, error message).

The invention claimed is:

1. A method for analyzing a transaction log stored in a database, wherein a computer readable storage medium comprises the database, wherein the computer readable storage medium is not a transitory signal, said method comprising steps of:
   a. providing, by a technical unit selected from the group consisting of a processor of a computer system and an application-specific integrated circuit (ASIC), the transaction log and at least one filter criterion;
   b. retrieving, by the technical unit from the transaction log stored on the computer readable storage medium, those records of transactions meeting at least one filter criterion, wherein the transaction log comprises a plurality of records of transactions, and wherein each record of transaction in the transaction log comprises at least one action executed and tested during a test and at least one associated recorded criterion, wherein the at least one action of each retrieved record includes one or more database processings on the database; and
   c. storing and/or displaying, by the technical unit, the retrieved records of transactions, a test verdict, and a message in accordance with the test verdict, wherein the test verdict is a negative test verdict or a positive test verdict if $Nr \neq Ne$ or $Nr = Ne$, respectively, wherein Nr is a number of determined database processings in all of the retrieved records of transactions in a time frame of the test, wherein Ne is a number of expected database processings on the database in the time frame of the test, wherein Nr, Ne, or both Nr and Ne is at least 2, wherein the at least one action executed and tested during the test comprises a primary action and secondary actions executed in the background, wherein each expected database processing, each database processing of the one or more database processings, the primary action, and each secondary action is of a database processing type selected from the group consisting of create, read, insert, update, and delete.

2. The method according to claim 1, wherein the method further comprises prior to step a:
   initiating, by the technical unit, the test in accordance with a specified criterion; and
   writing, by the technical unit, an executed at least one action with respective criteria in form of records of transactions into the transaction log.

3. The method according to claim 1, wherein the method further comprises performing, by the technical unit, actions consisting of:
   outputting the retrieved records of transactions retrieved from the transaction log, the test verdict, related transaction log data, and a message in accordance with the test verdict; and
   transmitting, to a computing unit, the retrieved records of transactions, the test verdict, related transaction log data, and a message in accordance with the test verdict.

4. A computer program product, comprising a non-transitory computer readable hardware storage device having computer readable program code stored therein, said program code executable by a processor of a computer system to implement a method for analyzing a transaction log stored in a database, wherein a computer readable storage medium comprises the database, wherein the computer readable storage medium is not a transitory signal, said method comprising steps of:
   a. providing, by a technical unit selected from the group consisting of the processor of the computer system and an application-specific integrated circuit (ASIC), the transaction log and at least one filter criterion;
   b. retrieving, by the technical unit from the transaction log stored on the computer readable storage medium, records of transactions meeting at least one filter criterion, wherein the transaction log comprises a plurality of records of transactions, and wherein each record of transaction in the transaction log comprises at least one action executed and tested during a test and at least one associated recorded criterion, wherein the at least one action of each retrieved record includes one or more database processings on the database; and
   c. storing and/or displaying, by the technical unit, the retrieved records of transactions, a test verdict, and a message in accordance with the test verdict, wherein the test verdict is a negative test verdict or a positive test verdict if $Nr \neq Ne$ or $Nr = Ne$, respectively, wherein Nr is a number of determined database processings in all of the retrieved records of transactions in a time frame of the test, wherein Ne is a number of expected database processings on the database in the time frame of the test, wherein Nr, Ne, or both Nr and Ne is at least 2, wherein the at least one action executed and tested during the test comprises a primary action and secondary actions executed in the background, wherein each expected database processing, each database processing of the one or more database processings, the primary action, and each secondary action is of a database processing type selected from the group consisting of create, read, insert, update, and delete.

5. The computer program product according to claim 4, wherein the method further comprises prior to step a:

initiating, by the technical unit, the test in accordance with a specified criterion;

executing, by the technical unit, a plurality of computer instructions stored on a non-transitory computer readable storage medium to perform at least one action to be tested; and writing, by the technical unit, the executed at least one action with respective criteria in form of records of transactions into the transaction log.

6. The computer program product according to claim 4, wherein the method further comprises performing, by the technical unit, actions consisting of:

outputting the retrieved records of transactions retrieved from the transaction log, the test verdict, related transaction log data, and a message in accordance with the test verdict;

transmitting, to a computing unit, the retrieved records of transactions, the test verdict, related transaction log data, and a message in accordance with the test verdict.

7. A system comprising a technical unit, wherein the technical unit is hardware selected from the group consisting of a processor of a computer system and an application-specific integrated circuit (ASIC), wherein the technical unit is configured to implement a method for analyzing a transaction log stored in a database, wherein a computer readable storage medium comprises the database, wherein the computer readable storage medium is not a transitory signal, said method comprising steps of:

a. providing, by the technical unit, the transaction log and at least one filter criterion;

b. retrieving, by the technical unit from the transaction log stored on the computer readable storage medium, records of transactions meeting at least one filter criterion, wherein the transaction log comprises a plurality of records of transactions, and wherein each record of transaction in the transaction log comprises at least one action executed and tested during a test and at least one associated recorded criterion, wherein the at least one action of each retrieved record includes one or more database processings on the database; and c. storing and/or displaying, by the technical unit, the retrieved records of transactions, a test verdict, and a message in accordance with the test verdict, wherein the test verdict is a negative test verdict or a positive test verdict if $Nr \neq Ne$ or $Nr = Ne$, respectively, wherein Nr is a number of determined database processings in all of the retrieved records of transactions in a time frame of the test, wherein Ne is a number of expected database processings on the database in the time frame of the test, wherein Nr, Ne, or both Nr and Ne is at least 2, wherein the at least one action executed and tested during the test comprises a primary action and secondary actions executed in the background, wherein each expected database processing, each database processing of the one or more database processings, the primary action, and each secondary action is of a database processing type selected from the group consisting of create, read, insert, update, and delete.

8. The system according to claim 7, wherein the method further comprises prior to step a:

initiating, by the technical unit, the test in accordance with a specified criterion;

executing, by the technical unit, a plurality of computer instructions stored on a non-transitory computer readable storage medium to perform at least one action to be tested; and writing, by the technical unit, the executed at least one action with respective criteria in form of records of transactions into the transaction log.

9. The system according to claim 7, wherein the method further comprises performing, by the technical unit, actions consisting of:

outputting the retrieved records of transactions retrieved from the transaction log, the test verdict, related transaction log data, and a message in accordance with the test verdict;

transmitting, to a computing unit, the retrieved records of transactions, the test verdict, related transaction log data, and a message in accordance with the test verdict.

10. The method according to claim 1, wherein $Nr \neq Ne$.

11. The method according to claim 1, wherein $Nr = Ne$.

12. The computer program product according to claim 4, wherein $Nr \neq Ne$.

13. The computer program product according to claim 4, wherein $Nr = Ne$.

14. The system according to claim 7, wherein $Nr \neq Ne$.

15. The system according to claim 7, wherein $Nr = Ne$.

16. The method according to claim 1, wherein the secondary actions executed in the background include a nested action.

17. The method according to claim 1, wherein the secondary actions executed in the background include recursive actions.

18. The method according to claim 1, wherein $Nr > Ne$.

19. The method according to claim 1, wherein the expected database processings pertain to only one table of the database, and wherein the determined database processings pertain to the only one table.

* * * * *